Nov. 4, 1930.　　　　　A. H. FISHER　　　　　1,780,748

LITTER GATHERING DEVICE

Filed Sept. 30, 1929

INVENTOR.
Albert H. Fisher,
BY
Fay, Oberlin & Fay,
ATTORNEYS.

Patented Nov. 4, 1930

1,780,748

UNITED STATES PATENT OFFICE

ALBERT H. FISHER, OF EAST CLEVELAND, OHIO, ASSIGNOR TO HERBERT B. SABIN, OF CLEVELAND, OHIO

LITTER-GATHERING DEVICE

Application filed September 30, 1929. Serial No. 396,210.

This invention as indicated relates to a litter gathering device. More particularly it comprises a device adapted to remove or gather litter of various character such as miscellaneous trash of scrap from workshops and the like, or leaves and litter on lawns, golf courses, and the like, without injuring the soil or surface in any manner and at the same time very effectively and quickly removing the accumulated matter.

Heretofore it has been proposed to provide lawn rakes, and the like, with resilient metal fingers, but such devices have the defect of contacting with the surface with unequal tension and having some of the teeth thereof dig into the top soil and injure the blades of grass or other plant life of the lawn.

The principal object of the present invention is to provide a device having a plurality of projections or teeth which will themselves be resilient throughout all or a substantial portion of their longitudinal extent and thus be free to yield individually to any necessary degree to clear the surface over which the device is moved to compensate for slight inequalities of such surface and thus avoid throwing up sections of sod or digging into or injuring the plant life of the lawn, or injuring any other surface to which it is applied, such as gravel walks, or floor surfaces. In fact the device is suitable to be used on polished floor surfaces without injuring the same.

Another object of the invention is to provide a lawn implement which may be constructed in part of rubber of a predetermined degree of resiliency which will most effectively serve to gather leaves and small particles of twigs and litter, such as are to be found on lawns, and propel them with successive strokes toward a point of removal. Another object of the invention is to provide a lawn implement which will be cheap to manufacture and at the same time will operate with greater effectiveness than ordinary lawn rakes, or brooms, or lawn implements having rigid or substantially rigid fingers, even though such fingers be resiliently supported.

A further object of the invention is to provide a resilient rubber tooth or projection to form part of any desired type of implement or apparatus, including revolving drum type litter gathering apparatus, which will have superior effectiveness in handling such material.

Other and further objects of the invention will appear in the course of the following description. To the accomplishment of the foregoing and related ends, said invention, then, consists of the means hereinafter fully described and particularly pointed out in the claims.

The annexed drawing and the following description set forth in detail certain structure embodying the invention, such disclosed means constituting, however, but one of various structural forms in which the principle of the invention may be used.

Figure 1:
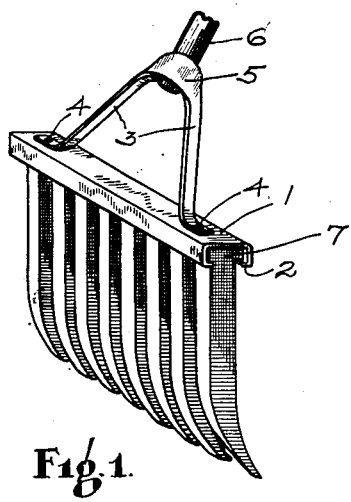
Fig. 1 is a perspective view of my preferred form of litter gathering device, having rubber teeth.

As is clearly shown in Fig. 1 of the drawing, the preferred form of the invention comprising an implement having a horizontal channel member 1 with overhanging flanges 2 at its base providing a wide slot with a substantially rectangular passageway through the body of said member from end to end. On the upper face of the member a pair of angularly disposed arms 3 are provided which are secured at their lower ends by rivets 4, suitably countersunk, or other fastening devices, to the channel member and at their upper ends terminate in a socket 5 within which a handle 6, which may be of wood or light metal as desired, may be suitably secured.

Within the channel member there is adapted to be engaged a rubber element 7 of approximately the size of the interior space within said channel member so as to be capable of being drawn lengthwise thereinto, said rubber member on its under face carrying a plurality of downwardly projecting teeth 8 also formed of rubber and spaced from each other a suitable distance which may be approximately twice the width of each individual tooth. The teeth are preferably curved or inclined at their lower ends 9 in one direction so as to present an angular lower contact area to engage with the leaves or other litter which may be upon the lawn, or other surface operated upon.

The rubber elements will be formed in suitable molds and preferably should provide fingers having a degree of resiliency corresponding approximately to that of the usual pencil eraser. Such rubber elements may be made out of reclaimed rubber, which is cheaper in cost than pure gum rubber and works more effectively than a rubber element having too great a degree of elasticity. The total length of the teeth is approximately three inches for an implement for general use although the proportions of the implement and its several parts may be varied for the particular type of grass covering the lawn. In the event that the implement is to be used for gathering up paper or other litter in an amusement park, or the like, it may be found for example that teeth of twice the usual length may be required. The spacing of the teeth may also be varied according to the particular use to which the implement is to be put. The teeth of the several modifications of my improved rake as illustrated in the drawing, are each shown with their outer ends of slightly reduced or tapered shape, whereby an increase in the resiliency of these members is afforded in such outer end portion over the upper portion which is engaged by the cross member.

While the implement has been described as being suitable for lawns, it is also adaptable for various other purposes and it is not intended in this description to limit the use of the implement to the maintenance of lawns and the like, but to include in the scope of the invention every use to which it may be properly applied.

Figure 2:
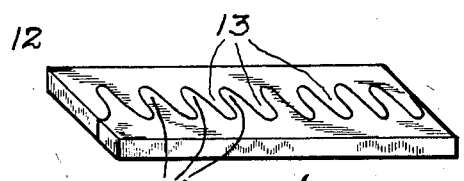
Fig. 2 is a perspective view illustrating a method of cutting toothed sections out of a blank of sheet rubber of suitable thickness.
Figure 3:
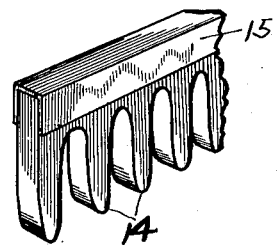
Fig. 3 is a fragmentary perspective view showing the manner of mounting one of the toothed sections shown in Fig. 3.

Another method of forming the implement of rubber is shown in Fig. 2, and comprises utilizing a sheet of rubber 12 of substantial thickness and having a depth sufficient to provide fingers which will have a longer transverse dimension than width. The sheet of this type is of sufficient width to form two complete resilient elements for a lawn implement. The sheet is severed centrally in a zig-zag line so as to produce two interlocking sets of teeth 13, 14, and when drawn apart may be individually mounted in an implement having a suitable channel member 15, such as is shown in Fig. 3.

Figure 5:
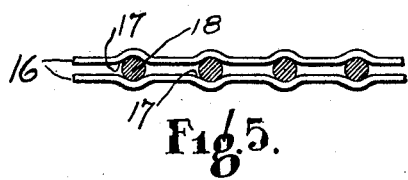
Fig. 5 is a fragmentary plan view showing the manner of supporting the teeth of the device shown in Fig. 4.
Figure 4:
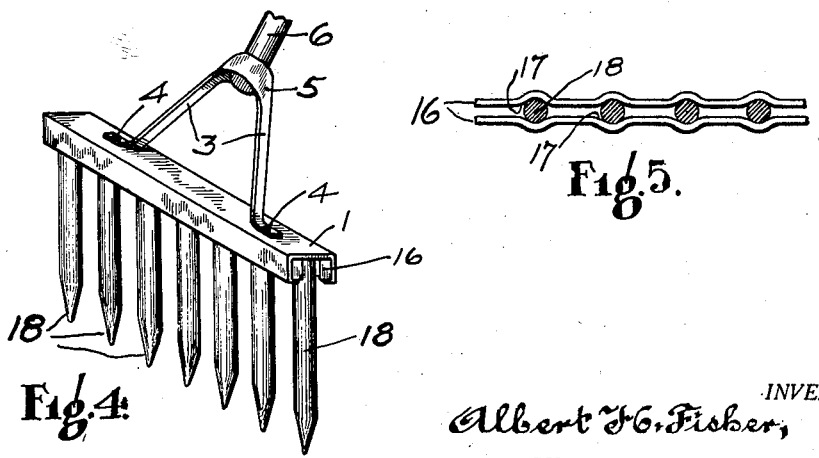
Fig. 4 is a perspective view showing a modified form of construction of the device.

Another method of producing the device is shown in Figs. 4 and 5. The channel member 1 is adapted to receive strips 16 providing a series of opposed arcuate recesses 17 at spaced intervals within which individual teeth 18 of rubber are engaged. When the parts are assembled the parts should be firmly engaged and not require the use of any other fastening means. The individual teeth may be of circular cross-section adjacent their central portions and suitably shaped at their free respective ends to form a suitable contacting terminal for engagement with the lawn surface. The supporting elements for the channel member, if desired, may take the form of a yoke, the angular members being turned to a suitable angle and the handle member being engaged therewith in the usual manner.

Obviously further variations in the means and manner of securing the various elements in operative relation may be made and the showing of various specific forms is not intended in any way to exclude other forms of structure from the scope of the invention.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. An article of the character described having in combination a cross member, adapted in use to provide a substantially horizontal support, a handle connected with said cross member, and a plurality of outwardly extending spaced flexible rubber members mounted on said cross member and of increasing resiliency toward their free ends.

2. A rake having a cross member, adapted in use to provide a rigid substantially horizontal support, and a rubber comb-like member supported thereby providing a plurality of elastic members.

3. An article of the character described having in combination a metal channel member having inwardly projecting flanges providing an intermediate slot, a block of rubber adapted to be frictionally engaged within said channel, said block of rubber being provided with a plurality of rubber members extending outwardly at spaced intervals through said slot in said channel member.

4. An article of the character described having in combination a metal channel member having inwardly projecting flanges providing an intermediate slot, a block of rubber adapted to be frictionally engaged within said channel, said block of rubber being provided with a plurality of rubber members extending outwardly at spaced intervals through said slot in said channel member and each of said individual members being angularly displaced at its free end toward the same side.

Signed by me this 16th day of August, 1929.

ALBERT H. FISHER.